United States Patent [19]

Nakamura et al.

[11] Patent Number: 4,601,511
[45] Date of Patent: Jul. 22, 1986

[54] ROOF STRUCTURE WITH REINFORCEMENT THEREFOR FOR AUTOMOTIVE VEHICLE

[75] Inventors: Yoshiharu Nakamura, Atsugi; Ryuji Nishimiya, Hiratsuka, both of Japan

[73] Assignee: Nissan Motor Company, Limited, Yokohama, Japan

[21] Appl. No.: 512,017

[22] Filed: Jul. 8, 1983

[30] Foreign Application Priority Data

Jul. 13, 1982 [JP] Japan ................ 57-121686

[51] Int. Cl.⁴ .................. B62D 25/06; E04C 2/32
[52] U.S. Cl. ...................... 296/210; 296/30; 296/111; 296/216; 52/814
[58] Field of Search ............ 296/30, 191, 204, 210, 296/216, 218, 220–222, 183, 29, 178, 181; 52/47, 48, 53, 814; 105/409, 410; 49/465

[56] References Cited

U.S. PATENT DOCUMENTS

| | | | |
|---|---|---|---|
| 1,027,503 | 5/1912 | Pries | 52/48 |
| 1,753,375 | 4/1930 | Heinen et al. | 52/814 |
| 2,054,784 | 9/1936 | Gilpin | 105/409 |
| 2,171,426 | 8/1939 | Dean | 52/48 |
| 2,578,052 | 12/1951 | Evanoff et al. | 296/183 |
| 3,124,224 | 3/1964 | Paul et al. | 296/29 |
| 3,188,131 | 6/1965 | Attwood | 105/409 |
| 3,200,784 | 8/1965 | Gowan, Sr. | 52/814 |
| 3,296,766 | 1/1967 | Dean | 52/814 |
| 4,085,965 | 4/1978 | Schlapp | 296/221 |
| 4,101,159 | 7/1978 | Stewart | 296/214 |
| 4,118,063 | 10/1978 | Bienert et al. | 49/465 |
| 4,130,966 | 12/1978 | Kujawa, Jr. | 296/218 |
| 4,254,987 | 3/1981 | Leonardis | 296/178 |
| 4,311,744 | 1/1982 | Watanabe | 296/188 |

FOREIGN PATENT DOCUMENTS

| | | |
|---|---|---|
| 6601996 | 4/1969 | Fed. Rep. of Germany . |
| 2444016 | 3/1976 | Fed. Rep. of Germany ...... 296/204 |
| 1530540 | 9/1976 | Fed. Rep. of Germany . |

OTHER PUBLICATIONS

J. C. Whitney & Co., catalog No. 374D, Copyright 1978, p. 35.
Motor-Rundschau 22, "Opel Caravan 1,7 Liter", 1963.

Primary Examiner—Robert R. Reeves
Assistant Examiner—Dennis H. Pedder
Attorney, Agent, or Firm—Schwartz, Jeffery, Schwaab, Mack, Blumenthal & Evans

[57] ABSTRACT

A roof structure for an automotive vehicle with a reinforcement for a roof panel is especially applicable for the vehicle having a sun-roof. Longitudinal reinforcement for the roof panel is provided by one or more pressed reinforcement ribs formed in the roof panel and extending parallel to the longitudinal axis of the vehicle. Each reinforcement rib has a front end located near the rear lateral edge of the sun-roof. A stiffener extends perpendicular to the axis of the reinforcement ribs and lies across the front ends of the reinforcement ribs for reinforcing the front ends at which bending stresses tend to concentrate.

7 Claims, 4 Drawing Figures

ROOF STRUCTURE WITH REINFORCEMENT THEREFOR FOR AUTOMOTIVE VEHICLE

BACKGROUND OF THE INVENTION

The present invention relates generally to a vehicle roof structure reinforced to prevent the roof from deforming due to bending stresses applied thereto. More particularly, the invention relates to a reinforcement for a vehicle roof structure with a sun-roof.

As is well known, the vehicle roof panel is supported by a vehicle body frame which might consist of a front roof rail, a rear roof rail and roof side rails. The roof panel is made from a relatively thin metal panel. Such roof panels must be reinforced across its central area. For reinforcing the central portion, one or more roof crossbars are provided extending laterally between the roof side rails. By means of such roof crossbars, satisfactory reinforcement can be obtained.

However, the weight of the roof is increased by the crossbar so that the overall vehicle body weight is increased. This will necessarily result in lower fuel economy and performance of the vehicle.

To keep the vehicle weight low and simultaneously obtain sufficient reinforcement, there has been proposed a roof structure incorporating one or more reinforcement ribs extending longitudinally along the vehicle. The reinforcement ribs are formed by a sheet metal pressing process or the like and effectively increase the stiffness of the roof panel. Thus, the vehicle roof panel with the pressed reinforcement ribs will be sufficiently strong to resist bending stresses applied thereto.

On the other hand, when the vehicle roof is provided with a sun-roof, the pressed reinforcement ribs are necessarily interrupted and must end at a point near the rear lateral edge of the sun-roof. As a result, the bending stress applied to the roof panel tends to be concentrated at the front ends of the reinforcement ribs to cause deformation of the roof panel at that point. Therefore, in practice, reinforcement with only pressed reinforcement ribs is not suitable for roofs with a sun-roof.

SUMMARY OF THE INVENTION

Therefore, it is an object of the present invention to provide a vehicle roof structure with pressed reinforcement ribs in which the roof structure is suitable even for vehicles equipped with a sun-roof structure on the roof and has sufficient stiffness against bending stresses.

According to the present invention, a vehicle roof structure is provided with a reinforcement including one or more pressed reinforcement ribs extending longitudinally and each reinforcement rib is associated with a rear roof rail at its rear end and a laterally extending cross member at the front end. The cross member extends between and is attached to the raised portion of the reinforcement rib and the flat portion lying on the front side of the front ends of the reinforcement ribs adjacent thereto.

This cross member serves as a reinforcement member for the front ends of the reinforcement ribs in order to prevent the bending stresses applied to the roof panel from concentrating at the front ends of the reinforcement ribs.

BRIEF DESCRIPTION OF THE DRAWINGS

The present invention will be understood more fully from the detailed description given herebelow and from the accompanying drawings of the preferred embodiment of the present invention which however, should not be taken as limitative to the invention but is provided for elucidation and explanation only.

In the drawings.

DESCRIPTION OF THE PREFERRED EMBODIMENT

Figure 1:
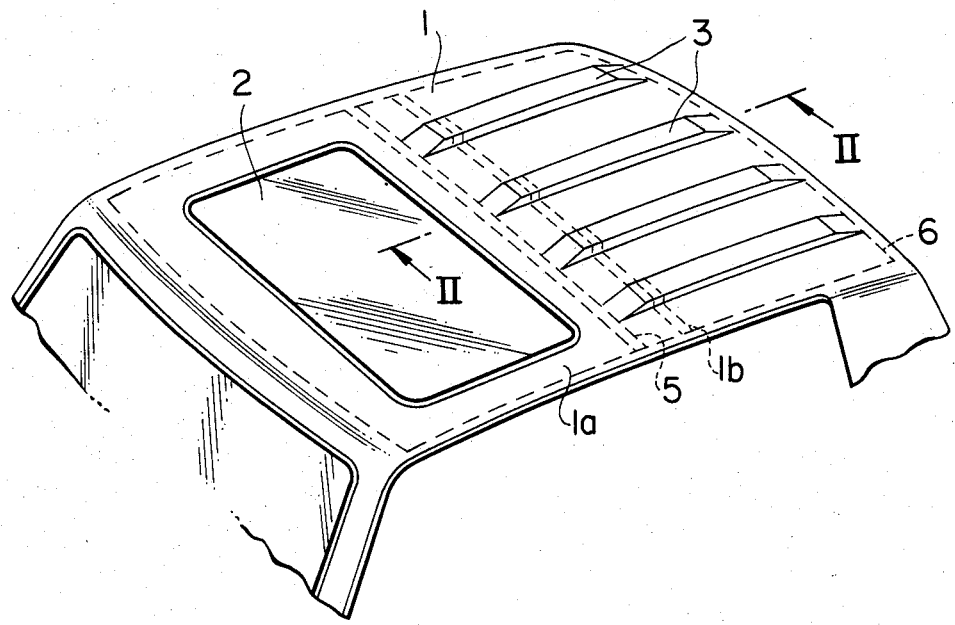
FIG. 1 is a perspective illustration of a vehicle roof with a sun-roof, to which the preferred embodiment of reinforcement structure for a roof panel is applied.
Figure 2:
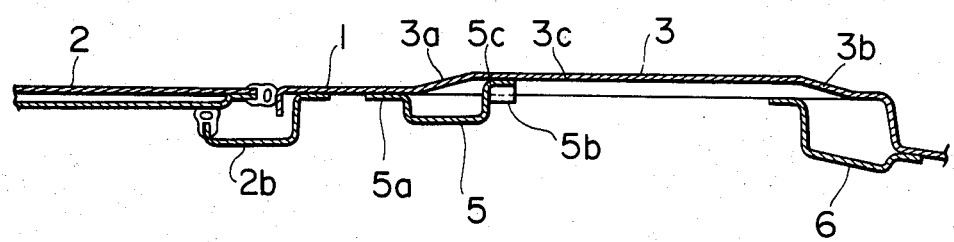
FIG. 2 is a enlarged longitudinal section of the vehicle roof taken along line II—II of FIG. 1.

Referring now to the drawings, particularly to FIGS. 1 and 2, there is illustrated the preferred embodiment of the vehicle roof structure with a plurality of reinforcement ribs for reinforcing the roof panel. As in FIG. 1, the vehicle shown has a sun-roof 2 on the vehicle roof 1 supported in a sun-roof frame 2b. The vehicle roof panel 1a is supported by a roof frame 1b including a front roof rail, a rear roof rail 6 and right and left roof side rails (not shown). A plurality of reinforcement ribs 3 are formed in the roof panel by press machining. Front and rear ends of the reinforcement ribs 3 taper toward the respective ends 3a and 3b. The reinforcement ribs 3 also have raised high-elevation portions 3c between the front and rear ends 3a and 3b.

The rear ends 3b of the reinforcement ribs 3 are fixedly secured to the rear roof rail 6 in a per se well known manner. On the other hand, the front end 3a of the reinforcement ribs 3 are secured to a cross member 5, such as a roof bow. The cross member 5 is essentially a flanged channel and extends between the right and left side rails and is attached thereto at both ends thereof. The cross member has a horizontal flange 5a along its front longitudinal edge. Also, a flange 5b extends horizontally from the rear longitudinal edge of cross member 5. The front flange 5a extends parallel to the line defined by the front ends of the reinforcement ribs and is fixedly attached to the roof panel 1 between the rear lateral edge of the sun-roof 2 and the front ends 3a of the reinforcement ribs 3. In practice, the front flange 5a is bonded onto roof panel with a suitable adhesive.

Figure 3:
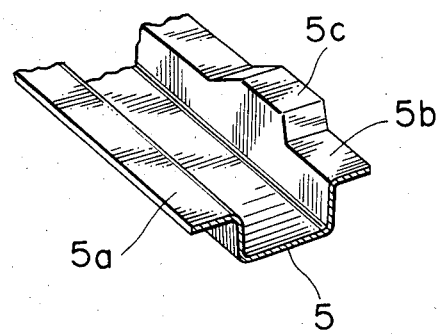
FIG. 3 is a partial perspective view of a crossbar employed in the preferred embodiment of the reinforcement structure of FIG. 2.

As shown in FIG. 3, the rear flange of cross member 5 is formed with a plurality of upwardly protruding bosses 5c, the number of which corresponds to the number of reinforcement ribs 3. The bosses 5c are so shaped as to conform to the opposing portion of the reinforcement ribs 3. The rest of the flange 5b has a flat surface which is attached to the generally flat surface of the roof panel. Similarly to the front flange 5a, the flange 5b is bonded onto the roof panel with a suitable adhesive.

Therefore, an enclosed space is defined by the roof panel and cross member at the point including the front ends 3a of the reinforcement ribs 3. In this construction, the cross member 5 serves as a stiffener for the roof structure, and the enclosed structure thereby defined reinforces the roof panel so that concentration of bending stress at the front end sections of the reinforcement ribs is satisfactorily prevented. Thus, according to the foregoing preferred embodiment, sufficient strength or stiffness is provided for the roof panel.

Figure 4:
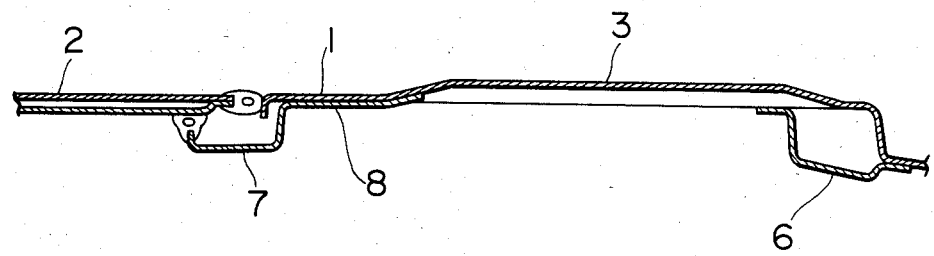
FIG. 4 is a longitudinal section similar to FIG. 2, but showing a modification of the preferred embodiment of FIG. 2.

FIG. 4 shows a modification of the foregoing preferred embodiment of reinforcement structure for the vehicle roof. In this modification, a rear lateral frame 7 of the sun-roof 2 serves as a stiffener so that an additional cross member 5 is not required, thereby reducing the number of parts making up the vehicle roof and thus reducing the weight. Furthermore, the rear flange 8 of the rear lateral frame 7 of the sun-roof 2 provides sufficient reinforcement for the front ends 3a of the reinforcement ribs 3 to prevent the roof panel from deforming at the front ends 3a of the reinforcement ribs.

While the present invention has been described hereabove with respect to the vehicle roof for the vehicle having a sun roof, it is possible to apply the same roof structure to a vehicle roof having no sun roof.

What is claimed is:

1. A reinforced roof structure for an automotive vehicle comprising:
   a roof frame rigidly defining the edges of the roof;
   a roof panel supported by the roof frame;
   a sun-roof including a sun-roof frame defining a sun-roof opening;
   at least one reinforcement rib formed in the roof panel and extending longitudinally, said reinforcement rib having a rear end supported by said roof frame and having a front end located at an intermediate portion of the roof panel adjacent a lateral section of said sun-roof frame and terminating at a predetermined distance from said lateral section, said rib being formed with said front end tapering to a substantially horizontal planar surface of the roof panel; and
   a laterally extending stiffener disposed substantially parallel to said lateral section of said sun-roof frame and attached to the intermediate portion of the roof panel opposing said front end of said reinforcement rib for reinforcing said front end, said stiffener being formed separately from said sun-roof frame and having a forward edge and a rear edge, said forward edge being substantially planar and attached to said substantially horizontal planar surface of said roof panel at a position adjacent to said lateral section of said sun-roof frame but spaced therefrom by a predetermined distance, said rear edge having a raised portion conforming to said reinforcing rib.

2. The roof structure as set forth in claim 1, wherein said stiffener comprises a channel-shaped, laterally extending cross member having a front flange attached to the roof panel and a rear flange formed with a boss conforming to the shape of the reinforcement rib so as to fit into the latter.

3. The roof structure as set forth in claim 1, wherein said vehicle roof has a sun roof with a sun roof frame rigidly reinforcing the edges of said sun roof, and said stiffener comprises a rear flange extending from said sun roof frame across said front end of said reinforcement rib.

4. A reinforced roof structure for an automotive vehicle with a sun-roof comprising:
   a roof panel having at least two parallel, longitudinally extending reinforcing structural features formed in the roof panel, corresponding first ends of which lie in an area of the roof panel adjacent one lateral edge of said sun-roof subject to bending stresses, said first ends being formed with a taper from a substantially horizontal plane of the roof panel to a vertically displaced plane of the structural feature;
   a sun-roof frame around a sun-roof opening and having a lateral component extending along said lateral edge of said sun-roof; and
   a transversely extending reinforcing member attached to the roof panel through the lateral extent of said roof panel and extending so as to be attached to each of said displaced planes of said structural features at one edge portion of said reinforcing member and to said substantially horizontal plane of said roof panel at another opposed edge portion of said reinforcing member for extending therebetween, said reinforcing member extending substantially parallel to said lateral component of said sun-roof frame in a side-by-side relationship thereto and being spaced from said lateral component of said sun roof frame by a predetermined distance.

5. The roof structure of claim 4, wherein said structural features are longitudinally-extending impressions in the roof panel.

6. The roof structure of claim 5, wherein the reinforcing member is a laterally-extending channel.

7. The roof structure of claim 6, wherein said channel has a flange with a profile which conforms to that of the roof panel and impressions.

* * * * *